US006322738B1

(12) United States Patent
Sicilia et al.

(10) Patent No.: US 6,322,738 B1
(45) Date of Patent: *Nov. 27, 2001

(54) METHOD OF INJECTION OVER-MOLDING ARTICLES

(75) Inventors: Robert Sicilia, Mississauga; Robert Schad, Toronto; Tom McGinley, Brampton; Doug Hietkamp, Bolton; Bruce Cateon, Georgetown; Kevin Gross, Bolton, all of (CA)

(73) Assignee: Husky Injection Molding Systems Ltd. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,655

(22) Filed: Feb. 4, 1998

Related U.S. Application Data

(63) Continuation of application No. 08/899,752, filed on Jul. 24, 1997, now abandoned.

(51) Int. Cl.[7] ............................ B29C 33/20; B29C 45/16
(52) U.S. Cl. ...................... 264/255; 264/266; 264/271.1; 264/275; 264/279; 264/328.7; 264/328.8; 264/513; 425/121; 425/525; 425/533; 425/534
(58) Field of Search ...................................... 264/255, 266, 264/271.1, 275, 279, 328.7, 328.8, 513, 537; 425/130, 577, 121, 125, 126.1, 533, 525, 523, 534

(56) References Cited

U.S. PATENT DOCUMENTS 3,947,176 * 3/1976 Rainville ........................ 425/130
4,067,944 * 1/1978 Valyi ............................... 64/89
4,209,290 * 6/1980 Rees et al. ..................... 425/547
4,321,029 * 3/1982 Aoki ............................... 425/523
4,744,742 * 5/1988 Aoki ............................... 425/126.1
4,830,811   5/1989 Aoki ............................... 264/513
5,573,791  11/1996 Marcus ........................... 425/523
5,582,788 * 12/1996 Collette etal. .................. 264/297

FOREIGN PATENT DOCUMENTS

| 0715937 | 6/1996 | (EP) | ............... B29C/45/16 |
| 2301368 | 9/1976 | (FR) . | |
| 2538297 | 6/1984 | (FR) . | |
| WO9702939 | 1/1997 | (WO) | ............... B29C/45/16 |

* cited by examiner

*Primary Examiner*—Jan H. Silbaugh
*Assistant Examiner*—Suzanne E. McDowell
(74) *Attorney, Agent, or Firm*—Katten Muchin Zavis

(57) ABSTRACT

A method of injection molding an over-molded article in which a cavity extension associated with a core is first moved to a disengaged position and the core is inserted into a first cavity having a defined volume in a first geometrical configuration. A first injection operation is performed into the first cavity to form a first layer of the article. The core is then removed from the first cavity with the first layer of the article on the core. The cavity extension is moved to an engagement position and the core and first layer are inserted into a second cavity. The second cavity and the cavity extension engage to form a composite cavity having a larger volume than the defined volume and define a second geometrical configuration. A second injection operation is performed into the composite cavity to over-mold the first layer to form the article. The core and cavity extension are separated from the second cavity to remove the article therefrom. The second cavity extension is moved relative to the core to remove the article from the core.

19 Claims, 9 Drawing Sheets

METHOD OF INJECTION OVER-MOLDING ARTICLES

This application is a continuation of application Ser. No. 08/899,752, filed Jul. 24, 1997, now abandoned.

FIELD OF THE INVENTION

The present invention relates to a novel injection mold, injection molding machine and an injection molding method for producing over-molded articles that can be made of one or more moldable materials. The invention is suitable for use with plastic resins, but can also be applied to glass, ceramics, powders or to combinations of them.

BACKGROUND OF THE INVENTION

Machines and molds for producing injection molded plastic articles of two or more layers of one or more different resins are well known. Such composite articles can be used in a wide variety of applications. Multi-materials can include materials with different molding properties, such as PET and PEN, the same material with various additives such as dyes, or combinations of these. For example, multi-layer multi-material articles which are injection molded include the keys used in personal computer keyboards, wherein the indicia of the function assigned to the key is formed from a different colored material than the remainder of the key and components such as multi-colored lenses used for the stop and turn signal indicator lights in automobiles.

Another common use is in the manufacture of multi-layer, multi-material articles for the packaging of food wherein, for example, U.S. FDA regulations require that only virgin plastic materials be employed in locations which contact the food. Generally, it is desired to reduce the amount of virgin material which is employed in such packages for both environmental reasons (wherein it is preferred to use recycled materials) and for cost reasons (as virgin material is more expensive than recycled plastic materials). Accordingly, multi-layer multi-material packages have been produced which include a first, thin, layer of virgin plastic material which contacts the food and a second, thicker, layer of recycled or otherwise less expensive material which is laminated to the first layer during injection molding to provide strength to the package.

One area where such multi-layer packaging is employed is in bottles and other vessels manufactured from PET or other materials. PET bottles and vessels are commonly blow molded from "preforms" in a well known manner, the preforms having been manufactured by injection molding to form a thread on the neck portion of the bottle to receive a bottle closure. It is known to form a multi-layer preform of PET, the inner most layer of which is virgin plastic and at least some portion of the remainder of the preform being recycled plastic material. In such cases, when the bottle or vessel is blow molded from the preform, the virgin material forms a continuous inner layer within the vessel and the recycled or other material surrounds the outside of the inner layer to increase the overall strength of the vessel to an acceptable level.

In other circumstances, the layers employed in multi-layer articles can have properties other than, or in addition to, being different colors and virgin and recycled materials, for example layers can have different chemical properties, etc. Also, more than two layers can be employed, if desired. It is known, for example, to produce a multi-layer preform for blow molding PET bottles and vessels wherein a layer of barrier material is located between the inner layer of virgin material and the recycled material, the barrier layer inhibiting take-up of $CO_2$ gas from carbonated beverages stored in the blown bottle by the PET materials behind the barrier.

Various systems and techniques for molding multi-layer, multi-material plastic articles are known. Generally, such systems are based on either co-injection, over-molding and/ or insert-molding systems. In all co-injection methods, the mold remains closed until the cavity is filled by the injection of two or more plastic materials into the cavity, either simultaneously or sequentially.

In sequential co-injection, a measured amount of a first material is injected into the cavity and an amount of a second material is then injected into the first material within the cavity. Due to a "skin" effect, the first material maintains its contact with the cavity walls and the second material pushes the first through the cavity, such that the materials fill the cavity with the second material sandwiched between inner and outer layers of the first.

In simultaneous co-injection, both materials are injected into the cavity at the same time, for at least part of the injection operation, and the differing viscosity, skin effects and other characteristics of the materials and the injection process result in the desired formation of layers of the materials within the cavity.

In the majority of co-injection methods, the article is made of maximum three different materials displaying different characteristics or/and functions. For example, one material can be a virgin resin, the second one can be a recycled version of same or different resin and the third can be a chemical barrier layer (such as EVOH, Nylon, MXD6) formed between them, or as a first layer. In common applications using two materials, an article can be formed having three or five layers (2M3L or 2M5L). If three materials are used, the article can have either three (3M3L) or five layers (3M5L).

Sequential co-injection systems for preforms are discussed in U.S. Pat. No. 4,781,954 to Krishnakumar et al. and U.S. Pat. No. 4,717,234 to Schad et al., the contents of each of which are incorporated herein by reference. A more recent co-injection system, shown in U.S. Pat. No. 5,582,788 to Collette et al., shows the use of a turret injection molding machine for co-injection which allows for improved cooling of molded articles.

Simultaneous co-injection systems for preforms are discussed in several U.S. Patents, such as those assigned to American National Can. Of interest in this regard in U.S. Pat. No. 5,523,045 to Kudert et al. which shows a multi-material co-injection nozzle design suitable for multi-layer preforms.

An innovative mold design capable of performing either simultaneous or sequential molding is described in U.S. Pat. No. 5,651,998 to Bertschi et al. and assigned to the assignee of the present invention. This application shows the first mold design wherein hot runner injection nozzles are located on the opposite sides of a cavity to inject two or more different resins. This approach simplifies the mold and allows for injecting into cavities which are arranged in a more compact, denser manner, as the nozzles for a single cavity are not on the same side of the mold.

While conventional co-injection methods offer some advantages as they use a single cavity and all the injection units are on one side of the injection molding machine, they also have several significant drawbacks. One of them is that it is difficult to obtain continuous and uniform layers of the different materials as they interact in a complete molten state and proper metering of the materials is often difficult. This is especially true when three materials are to injected. Further, the mold design and the hot runner design become very complicated as a single manifold or a single nozzle must be able to work with different materials having different processing parameters. These problems are further exacerbated for high cavitation molds, such as 48 or 96 cavity molds. Another difficulty is cooling, wherein thick articles require longer residence time in the mold close position, which affects the cycle time.

Some of the disadvantages of the co-injection systems are overcome by over-molding systems, where each injection operation is performed in a different mold cavity. Generally, the first injection operation is performed in a mold cavity to create the first layer of an article and the cavity is then changed to increase the volume and, commonly, to alter the geometry of the cavity space. Usually this is accomplished by changing the cavity and using the same core that holds the molded article. A second molding operation is then performed with the first layer of the article, which is retained by the core, being placed in the changed cavity. During the second injection the new molded material bonds to the previously molded layer in the mold to form the multi-layer article. As will be apparent, while the second cavity has a larger volume than the first, it will be understood by those of skill in the art that the actual cavity volume which must be filled in the second injection operation can be less than the volume filled in the first injection operation, with the balance of the volume being occupied by the first layer. As will also be apparent, over-molding can include more than one over molding operation to form articles using more than two resins and/or with more than two layers, if desired.

While good results can be obtained by over-molding, the necessity to open the mold to move a previously molded layer of an article to a second mold cavity for molding of the next layer has been difficult to achieve in a cost effective and reliable manner, especially if there are geometrical profile differences between the over-molded layers. U.S. Pat. No. 3,914,081 to Aoki shows an early attempt to perform over-molding employing a rotary stripper plate which is used to extract, hold and transfer a molded first layer of an article to a second mold cavity, wherein a second layer of resin of a different color is injected. U.S. Pat. No. 3,947,176 to Rainville shows a split mold design that allows ejection of the article after the molding of a threaded neck portion of the article by splitting the mold laterally. Rainville-type molds have proven to be difficult to manufacture, need more "real estate" to allow opening of the mold walls, present sealing problems over a greater area and tend to leave injection marks on the molded article.

Attempts to produce a more suitable over-molding system include U.S. Pat. No. 4,744,742 and U.S. Pat. No. 4,830,811 to Aoki which shows a two cavity mold design for preforms which is used with a rotary injection blow-molding machine. In these systems, the core enters a first cavity in which the first, inner, layer of a preform to molded. The core is then removed from the first cavity with the molded layer still in place and is inserted into a two portion second cavity, the lower portion of which is a single piece cavity of a larger diameter than the first and the upper portion of which is a two-part, split, cavity which defines threads for the neck portion of the preform. The second layer is then injected into the two portion cavity and the core is removed from within the cavity. The upper, threaded, portion of the cavity extracts the molded preform from the lower portion of the cavity and moves it to a blow molding station. After blow molding, the upper portion of the cavity is split to allow removal of the finished bottle.

The system taught by Aoki suffers from a number of disadvantages. First, the design is not readily applicable to forming more than two preforms per cycle, due to the complexity of the transfer platen used to move articles and the upper portions of the molds. Also, after the second injection operation is performed, the core is removed from the molded article prior to its transfer to the blow-molding station, preventing cooling of the interior of the preform by the core during the transfer. Thus, the bulk of the cooling must be performed before removal of the core, resulting in a relatively long cycle time.

A more recent attempt to produce over-molded preforms having a thread on the neck portion is shown in published European Patent Application 715,937 A1 to Massano. This reference teaches an injection mold to perform two-layer over-molding of a two-material PET preform wherein the mold comprises a stationary cavity plate, a moveable stripper/cavity and core plates. The cavity plate comprises adjacent pairs of single piece cavities of two different diameters and the stripper/cavity plate includes adjacent pairs of two-part cavity portion elements which can be split laterally. One cavity portion of each pair, which is aligned with the smaller diameter cavity in the cavity plate, has a smooth bore of the same diameter as the smaller diameter cavity and the other cavity portion of each pair, which is aligned with the larger diameter cavity, includes a thread to define the threaded neck portion of the preform.

The core plate has rotatable pairs of adjacent cores and molding is performed by inserting the pairs of cores into the pairs of cavities with the stripper/cavity plate contacting the cavity plate so that the cavity portions on the stripper/cavity plate form part of the cavity for the injection operation.

A complete injection operation is performed by injecting a first layer of material into the smaller diameter cavity and cavity portion, then the core and cavity/stripper plates are each moved away from the cavity plate until the end of the molded preform has been completely removed from the cavity, after which the core plate continues to move away from the cavity plate while the stripper/cavity plate remains in place. The core plate moves away from the now stationary stripper/cavity plate to remove the molded first layer, which remains on the core, from the smooth-bored cavity portion on the stripper/cavity plate. Just prior to the core being completely removed from the cavity portion, the two parts defining the pair of cavity portions are separated to allow the completed preform (commenced in the previous injection cycle) to fall from the threaded cavity portion, having been removed from the core by the engagement of the molded threads with the threaded cavity portion.

The molded first layer remains on the other core, being pulled through the smooth-bored cavity portion. Once the core and the molded first is completely removed from the smooth-bored cavity portion, the pair of cores are rotated one hundred and eighty degrees on the cavity plate so that the core with the molded first layer can now be inserted into the larger diameter cavity, through the threaded cavity portion on the stripper/cavity plate, and the now-empty other core can be inserted into the smaller diameter cavity through the smooth-bored cavity portion to commence another injection molding cycle.

The core plate and the stripper/cavity plate are closed to the cavity plate and the second layer is injected into the larger diameter cavity and the threaded cavity portion to complete the molding of the preform on this core (a first layer is injected into the other cavity with the smooth-bored cavity portion to commence the molding of the perform on that core). The cavity plate and stripper/cavity plate are then moved away from the cavity plate, as described above, to eject the completed preform and to rotate the cores for the next portion of the cycle.

The Massano system described above suffers from several disadvantages. In particular, the core plate must be moved away from the cavity plate for a distance exceeding at least twice the length of the molded articles while the stripper/cavity plate must be moved away from the cavity plate for a distance exceeding the length of the molded articles to allow ejection of the molded articles. These opening requirements result in a slower cycle time, while the plates move the required distances, and in a machine which requires a relatively large amount of floor space in which to operate. Also, the molded first layer is pulled through the smooth-bored cavity portion at the end of the first injection operation and this can result in damage to the molded first layer. Further, the requirement to rotate each pair of cores increases the expense of manufacturing the machine and can lead to leaking of cooling fluid from the cores, etc.

Published PCT patent application WO 97/02939 to Collette et al. shows two other injection molding machines for over-molding. The first machine shown is a turret machine with a number of cores mounted on each of a pair of opposed sides of the turret and a pair of cavity plates, each with a set of a corresponding number of cavities, facing each turret face. The first set of cavities is used to form the first layer of the molded article and the second set of cavities each including cavity extension portions to define the threads of a preform neck. One cavity plate and the turret move relative to the other cavity plate, and the turret rotates to move cores with a first molded layer from the first set of cavities to the second set of cavities where the second layer is molded with the cavity extension portions closed. The turret mold shown in Colette is used in conjunction with a conventional three platen injection molding machine. As shown in FIG. 2a of Colette, the second injection station unit (more exactly the second cavity plate) is located opposite the first one and in front of the clamping unit (not shown). The clamping unit thus prevents the injection unit from being located perpendicular to the mold plate, and instead it must be located at 90° to the stroke of the clamping unit. This results in Collette's machine having a large total foot-print. Further, Collette system requires an additional ejection system on the core plate to eject the molded articles from the cores which have been retracted from the second set of cavities. Such ejections systems are expensive and/or difficult to provide and can introduce other problems in the molding operation, such as core shift.

The second machine taught in Collette is a shuttle-type system wherein the cavity plate has two sets of first cavities surrounding a set of second cavities and two sets of cores are mounted to a core plate which shuttles the cores between a first position, wherein the first set of cores is aligned with one set of first cavities and the second set of cores is aligned with the second set of cavities, and a second position, wherein the first set of cores is aligned with the second set of cavities and the second set of cores is aligned with the other set of first cavities. The core plate is laterally "shuttled" between the first and second positions each time the mold is opened to sequentially insert a core in one of the first sets of cavities, where a first layer is molded, and then in one of the second set of cavities where the second layer is molded. This machine suffers from disadvantages in that it requires an extra set of cavities, i.e. —three sets of cavities produce two sets of articles, which increases the expense of the mold.

Multi-layer articles can also be formed by insert-molding wherein an insert, formed by extrusion, injection molding, thermoforming, etc., is placed into a mold cavity and a layer of another material is then injected to fill the cavity. In fact, insert-molding can be combined with over-molding or co-injection to encase the insert between multiple layers of different materials, if desired.

It is desired to have an efficient, reliable and cost-effective injection molding machine and mold therefore to form multi-layer molded articles.

SUMMARY OF THE INVENTION

It is an object of the present invention to provide a novel injection molding method, machine and mold therefore to produce multi-layer molded articles.

According to a first aspect of the present invention, there is provided an injection mold for producing over-molded articles, comprising:

a cavity plate having first and second cavities mounted thereon;

a core plate having a core mounted thereon;

a cavity extension comprising a pair of cavity element located about said core;

cavity extension operating means on said core plate to move said pair of cavity elements between an open position wherein said core can be inserted into said first cavity between said pair of cavity elements and a closed position wherein said pair of cavity elements are combined with said second cavity to form a composite cavity of greater volume than said first cavity; and a mold clamping unit operable with said cavity operating means to close said mold by inserting said core into said first cavity when said cavity extension elements are in said open position and to close said mold by inserting said core into said composite cavity when said cavity elements are in said closed position.

According to another aspect of the present invention, there is provided an injection molding machine for producing over-molded articles, comprising:

a cavity plate having first and second cavities mounted thereon, said second cavity having a cavity depth less than the cavity depth of said first cavity;

a core plate having a core mounted thereon, said core plate being movable relative to said cavity plate;

a cavity extension comprising a pair of cavity elements located about said core, said cavity extension having a depth substantially equal to the difference between the cavity depths of said first cavity and said second cavity and defining a geometric configuration different from that of said first cavity; and cavity extension operating means on said core plate to move said pair of cavity elements between an open position wherein said core can be inserted into said first cavity between said pair of cavity elements and a closed position wherein said pair of cavity elements are combined with said second cavity to form a composite cavity which receives said core.

According to another aspect of the present invention, there is provided an injection mold for producing over-molded articles comprising:

a cavity plate having first and second cavities mounted thereon, said second cavity having a cavity depth less than the cavity depth of said first cavity;

a core plate having a core mounted thereon, said core plate being movable relative to said cavity plate;

a cavity extension comprising a pair of cavity elements located about said core, said cavity extension having a depth substantially equal to the difference between the cavity depths of said first cavity and said second cavity and defining a geometric configuration different from that of said first cavity; and cavity extension operating means on said core plate to move said pair of cavity elements between an open position wherein said core can be inserted into said first cavity between said pair of cavity elements and a closed position wherein said pair of cavity elements are combined with said second cavity to form a composite cavity which receives said core.

According to yet another aspect of the present invention, there is provided a method of injection molding an over-molded article, comprising the steps of:

(i) moving a cavity extension associated with a core to a disengaged position;

(ii) inserting said core into a first cavity having a defined volume and a first geometrical configuration;

(iii) performing a first injection operation into said first cavity to form a first layer of said article;

(iv) removing said core from said first cavity with said first layer of said article on said core;

(v) moving said cavity extension to an engagement position;

(vi) inserting said core and said first layer into a second cavity, said second cavity and said cavity extension engaging to form a composite cavity having a larger volume than said defined volume and defining a second geometrical configuration;

(vii) performing a second injection operation into said composite cavity to over-mold said first layer to form an article;

(viii) separating said core and cavity extension from said second cavity to remove said article therefrom; and (ix) moving said cavity extension relative to said core to remove said article from said core.

According to yet another aspect of the present invention, there is provided an injection molding machine for producing over-molded articles, comprising:

a cavity plate having first and second cavities mounted thereon, said second cavity having a cavity volume greater than the cavity volume of said first cavity, each of said first and second cavities having means to receive an injection nozzle;

at least one injection unit to perform an injection operation into said first and second cavities;

a core plate having a core mounted thereon;

a cavity extension adjacent said core;

cavity extension operation means on said core plate to move said cavity extension between a disengaged position, wherein said cavity extension is distal said first cavity, and an engaged position, wherein said cavity extension combines with said second cavity to form a composite cavity; and a mold clamping unit operable with said cavity operating means to close said mold by inserting said core into said first cavity when said cavity extension is in said disengaged position and to close said mold by inserting said core into said composite cavity when said cavity extension is in said engaged position.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
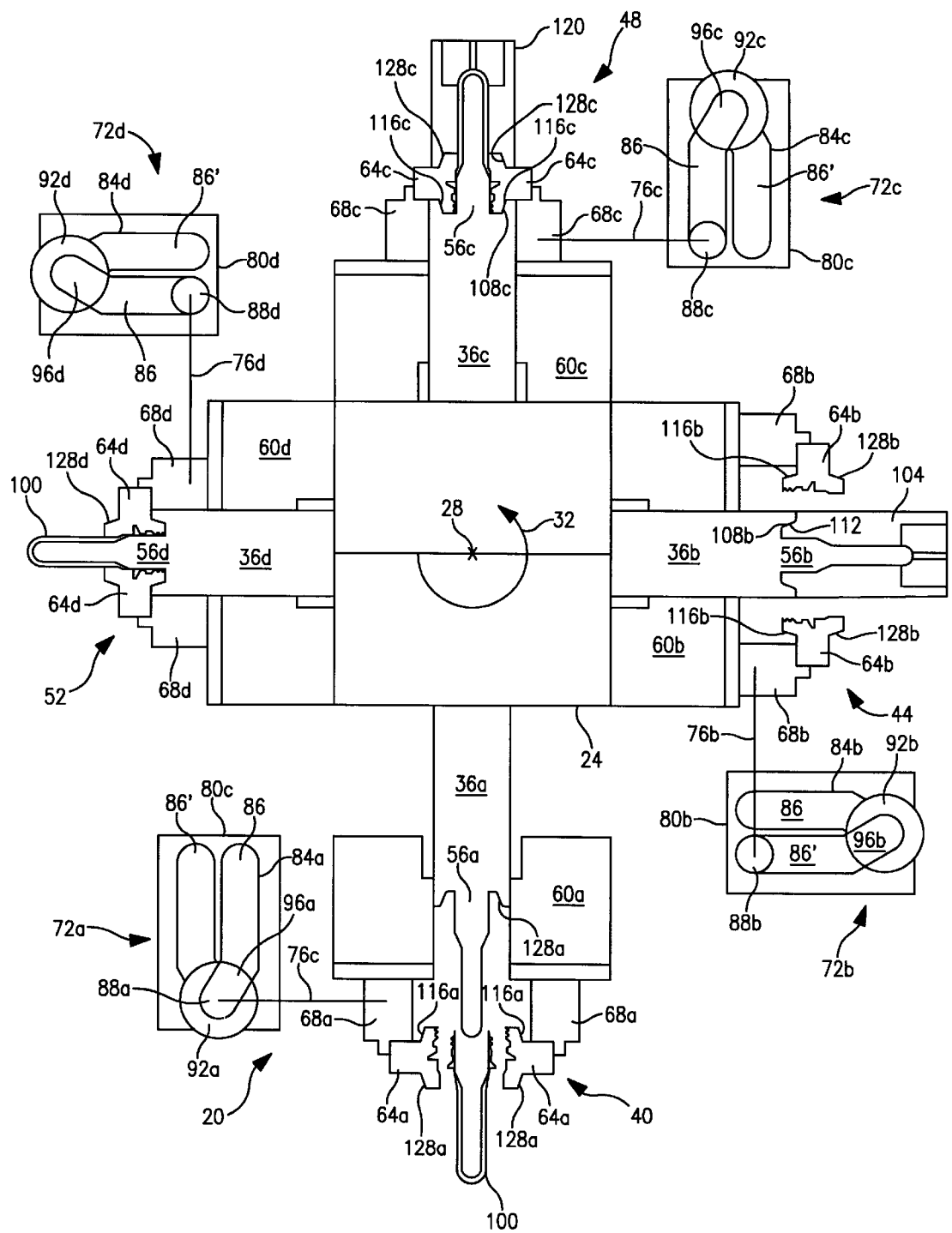
FIG. 1 shows a schematic representation of section through the turret of an injection molding machine and a mold in accordance with a first embodiment of the present invention.

In FIG. 1, an injection molding machine in accordance with an embodiment of the present invention is indicated generally at 20. As shown, machine 20 is a turret mold that can be advantageously operated on an innovative two-platen injection molding machine, similar to that described in co-pending U.S. patent application Ser. No. 08/772,474, filed Dec. 23, 1996 to Koch et al. and assigned to the assignee of the present invention, now U.S. Pat. No. 5,817, 345, and the contents of which are included herein by reference. This two platen injection molding machine is not only faster then than three platen machines, but also allows placing of various molding stations at any location around the turret mold, which saves space and provides manufacturing flexibility.

Machine 20 includes, for example, a four-sided turret 24 which can be rotated about axis 28 (that can be vertical, horizontal, etc.), in the direction indicated by arrow 32. As will be apparent to those of skill in the art, turret 24 is rotated as desired to move four mold core assemblies 36a, 36b, 36c and 36d between four different molding operations stations 40, 44, 48 and 52. In the FIG. 1, and in the following discussion, similar components on each side of turret 24 are identified with like reference numerals to which an "a", "b", "c" or "d" is appended to identify the particular station the component illustrated is located at.

Further, FIG. 1 shows a partial cross-section through turret 24 so that only one core assembly 36 per side is visible. However, as will be apparent to those of skill in the art, turret 24 can include multiple core assemblies 36 on each side with corresponding numbers of components being located at each station 40, 44, 48 and 52 as needed. In a presently preferred embodiment of the invention, each side of turret 24 includes forty eight core assemblies 36 on each side of turret 24.

In FIG. 1, station 40 is an ejection station, station 44 is a first molding station, station 48 is a second molding station and station 52 is a cooling station. As shown in FIG. 1, each mold core assembly 36 includes a mold core 56, a stripper plate 60, a pair of cavity extension elements 64, each of which is attached to a slide means 68, 68'. While not shown in the Figure, core 56 is provided with suitable means for circulating cooling fluid within core 56 and turret 24 is provided with suitable means for moving stripper plate 60, which movement is described below in more detail.

Each slide means 68, 68' is connected to a respective one of a pair of slide operators 72 via a tierod 76 and slides 68, 68' can move toward or away from core 56 under the control of a respective slide operator 72. Slide operators 72 operate as cavity extension operating means, as further described below. It should be noted that, for clarity, only one of the two slide operators 72 and one of the two tierods 76 of each core assembly 36 is shown in FIG. 1 but in practice two slide operators 72 are provided on each side of turret 24.

Each slide means 68 extends longitudinally along the side turret 24 with each cavity extension element 64 on a first side of each core 56 being mounted to slide means 68 adjacent that first side and each cavity extension element 64 on a second side of each core 56 being mounted to slide means 68 adjacent that second side such that, movement of a slide means 68 by its respective slide operator 72 results in all the cavity extension elements on a side of cores 56 moving in unison toward or away from core 56.

In the embodiment of FIG. 1, each slide operator 72 comprises a cam support 80 mounted to turret 24, each cam support having a cam track 84 therein with two legs 86 and 86' in which a cam follower 88 can move. Each cam follower 88 is connected to a respective slide means 68 by a respective tierod 76 and cam follower 88 moves with slide means 68 and with stripper plate 60. At the extremity of cam track 84 distal turret 24, there is a cam director 92 which operates to switch cam follower 88 between a leg 86 and a leg 86' via a gate 96. As shown in the Figure, each leg 86 and 86' includes an inclined portion adjacent cam director 92 and a straight portion adjacent the side of turret 24.

Cam director 92 is rotatable to move gate 96 into communication with the inclined portion of either leg 86 or 86', as described below in more detail. Cam director 92 can be rotated by any suitable means as will occur to those of skill in the art, and in a presently preferred embodiment is rotated by pneumatic means.

The process of creating a multi-layer injection molded article with machine 20 will now be described, by discussing the operations performed at each station in turn. It will be apparent to those of skill in the art that, while the following discussion relates to the molding of a single article on a single side of turret 24, in operation of machine 20 multiple articles are being molded and/or operated on each side of turret 24, at each station 40, 44, 48 and 52.

The injection molding operation for a multi-layer article commences with a core assembly 36*a* at station 40. As shown in FIG. 1, core 56*a* is empty, a previously formed multi-layer article 100 (if any) having been stripped from core 56*a* by stripper plate 60*a* moving away from turret 24 as will be described further below. Cam followers 88*a* in each cam operator 72 are located in gate 96*a* so that tierods 76*a* have slides 68 in a half-open position, allowing previously molded article 100 (if any) to be ejected. Cam directors 92*a* are then rotated to bring gate 96*a* into alignment with leg 86' and turret 24 is rotated ninety degrees in the direction indicated by arrow 32.

At station 44, the second step of the process is shown wherein stripper plate 60*b* is moved adjacent turret 24. Stripper plate 60*b* is moved toward or away from turret 24 in any suitable manner as will occur to those of skill in the art and, in a presently preferred embodiment of the invention, is performed via hydraulic cylinders. As stripper plate 60*b* moved toward turret 24, cam followers 88*b* move along the inclined portions of legs 86' to the straight portions adjacent turret 24, moving tierods 76*b* away from core 56*b* and thus moving slides 68*b* and cavity extension elements 64*b* mounted thereon, to a fully opened position. As will be apparent to those of skill in the art, the movement of stripper plate 60 can be performed simultaneously with the rotation of a side of turret 24 to station 44 from station 40, to reduce total cycle time, or can be performed once that rotation is complete.

A first cavity 104 is then brought into engagement with core 56*b*, extending between cavity extension elements 64*b*, and a first injection operation is performed. As shown in FIG. 1, the base of core 56*b* directly engages cavity 104 via corresponding inclined surfaces 108 and 112 which aid in sealing cavity 104. First injection operation can be performed with a single material or can be a co-injection operation, either simultaneously or sequentially, as will be apparent to those of skill in the art.

When the first injection operation is complete, cavity 104 is retracted from core 56*b* and stripper plate 60*b* is moved away from turret 24 to move cam followers 88 into gates 96*b*. Cam directors 92 are then rotated to align gates 96*b* with the inclined portions of legs 86 while turret 24 is rotated to move core 56 with the molded article thereon to station 48.

At station 48, or while rotating to station 48, stripper plate 60*c* is moved to a position adjacent turret 24, thus moving cam followers 88 along the inclined portions of legs 86 to the straight portions of leg 86 proximal turret 24. As cam follower 88 is moved along the inclined portions of legs 86, tierods 76 and slides 68 are moved towards core 56*c*, bringing the two halves of cavity extension element 64*c* into engagement about core 56*c*. As stripper plate 60*c* continues to move toward turret 24, cam followers 88 moves along the straight portion of leg 86 and the inclined surface 116*c* of the engaged cavity extension elements 64*c* engages the inclined surface 108*c* at the base of core 56*c*.

A second cavity 120 is then moved into engagement with cavity extension elements 64*c*, second cavity 120 having an inclined surface 124 complementary to an inclined surface 128 on engaged cavity extension elements 64*c*.

As will be apparent, cavity 120 has a shorter length and a greater diameter than cavity 104. As will also be apparent, cavity 120 is combined with the cavity formed by cavity extension elements 64*c* to obtain the required total length of the cavity. As will also be apparent, the portion of the combined cavity formed by cavity extension elements 64*c* defines different geometric features for a portion of the article to be molded in the combined cavity. In the illustrated embodiment, these different geometric features comprise threads for the neck portion of a preform, although any other features of differing geometries can be provided as will occur to those of skill in the art.

A second injection molding operation is then performed at station 48 to fill the combined cavity comprising cavity 120 and cavity extension elements 64*c*. The second injection operation can be performed with a single material or can be a co-injection operation, either simultaneous or sequential, as will be apparent to those of skill in the art.

When the second injection molding operation is completed, cavity 120 is removed, leaving molded article 100 on core 56c and turret 24 is rotated to move core 56c, with article 100 still thereon, to station 52. At station 52, article 100 is cooled, both by cooling fluid circulated within core 56d and by cooling air blown over article 100.

Next, turret 24 is rotated to bring core 56d, and article 100 thereon, to station 40 to complete the molding operation. At station 40, stripper plate 60a is moved away from turret 24, moving cam followers 88a along legs 86. Cavity extension elements 64c are still engaged with each other and with article 100 and force article 100 along core 56a as stripper plate 60a moves away from turret 24. As stripper plate 60a approaches the limit of its movement away from turret 24, each cam follower 88 engages the inclined portion of legs 86, moving tierods 76 to disengage cavity extension elements 64a from each other and from article 100. As article 100 is substantially free of core 56a at this point, article 100 is ejected from machine 20 and can be removed from the vicinity of machine 20 by any suitable means such as a conveyor. Each cam follower 88 enters a respective gate 96a, movement of stripper plate 60a ceases and the molding cycle is complete and machine 20 is ready to commence another cycle.

While the description above discusses a single molding cycle, it will be apparent to those of skill in the art that, in fact, four molding cycles are performed simultaneously, with each station 40, 44, 48 and 52 performing its respective operations on a different one of four different cycles.

While in the embodiment of FIG. 1 machine 20 includes the above-mentioned four stations, it will be apparent to those of skill in the art that the number of stations and the corresponding numbers of sides of turret 24 can be selected as required by the molding operation to be performed. Further, while machine 20 of FIG. 1 includes the above-mentioned four different molding stations, it will be apparent to those of skill in the art that all the stations need not be different. For example, if eight stations are provided, they can comprise two repeated sets of the four stations described above to allow to complete articles to be produced on each half of a complete rotation of turret 24. In either case, the number of simultaneous machine cycles which can be performed can be selected as desired. Also, it is contemplated that in some circumstances it may be desired to have a second cavity extension, formed from a second pair of extension elements, which can be used to form a composite cavity with a third cavity for a third injection operation. In such a case, the second pair of extension elements can move between their open and closed positions in a direction perpendicular to the pair of cavity elements for the first cavity extension, such that either both sets can be open at the same time or either set can be closed, as desired.

One of the significant problems which must be faced when injection molding articles is that the material, or materials, which are injected can be damaged by a slow transition from liquid to solid states as the article is cooled. The present inventors have determined that this damage, commonly referred to as the crystallinity problem, is mitigated or eliminated if adequate cooling and short cavity residence times can be obtained. As will be apparent, over-molding can aggravate the crystallinity problem in two aspects, the first being that the first layer acts as an insulator between the core and the second layer, inhibiting the transfer of the heat from the second layer to the core and the second being that the first layer is reheated, to some extent, by the injection of the second layer, thus enabling the formation of crystalline areas in the first layer during the second injection. In an over-molded article, this crystallinity problem can lead to failure of the inner layer, for example allowing food to contact the second layer of recycled material, or even total failure of the article.

Accordingly, as determined by the present inventors, the provision of cooling station 52 in the embodiment of FIG. 1, which allows both internal cooling of the article from the core and external cooling from the blown air or other cooling fluid at station 52, is believed to provide significant advantages in allowing the reduction of crytallinity in over-molded articles. It is further contemplated that another cooling station can be provided in some circumstances, between station 44 and station 48, to provide external cooling to the first layer between injection operations. In such a circumstance, turret 24 can have more than four sides or one or more stations, such as station 40 and station 52, can be combined.

If it is desired to produce an article which is over-molded over an insert, it is contemplated that, in the situation wherein the insert is pre-formed by a separate process, an insert loading operation can be combined with the ejection operation at station 40, and the insert placed on core 56a after ejection of a completed article 100, or can combined with the machine operation at any other appropriate station. In the situation wherein the insert is to be molded in place by machine 20, an appropriate additional station can be added at an appropriate location, as will also occur to those of skill in the art. In the situation wherein it is desired to mold over an insert between the injection operations, an appropriate additional station to load the insert onto a first, or subsequent, layer of the molded article can be provided between injection stations.

A second embodiment of the present invention will now be described with reference to FIGS. 2 and 2a through 8 wherein another molding machine in accordance with the present invention is indicated generally at 200 and similar components to those of the embodiment of FIG. 1 are identified with like reference numerals, although in these Figures the letters "a" and "b" are appended to distinguish between two sets of components. As described below, machine 200 is a rotary machine.

Machine 200 comprises a core plate 204 which includes a series of identical core assemblies 36 including cores 56, a stripper plate 60 and a set of slides 68, each of which has one or more cavity extension elements 64 mounted thereon. Machine 200 includes a pair of slide operators 72 which are mounted to core plate 204 and cam followers 88 in each slide operator 72 move with stripper plate 60, as described above with respect to machine 20. Each cam follower 88 is directly connected to the slide means 68 closest to it via a tie bar 76 and the remaining slides 68 are connected to alternating remaining slides via additional tierods 76 extending between slides 68 such that every second slide means 68 is operated by one slide operator 72 and the remainder of slides 68 are operated by the other slide operator 72. For example, in FIG. 2a slides 68b and 68a are operated by slide operator 72b while slide means 68c is operated by slide operator 72a.

In a preferred aspect of the present invention, cooling fluid is circulated to slides 68, and thus to cavity extension elements 64, via tierods 76 which are hollow, providing closed conduits between slides 68 through which cooling fluid is circulated. This use of tierods 76 to circulate cooling fluid to slides 68 is believed to be particularly advantageous and eliminates the need for cooling fluid hoses to be provided each slide 68.

Figure 2:
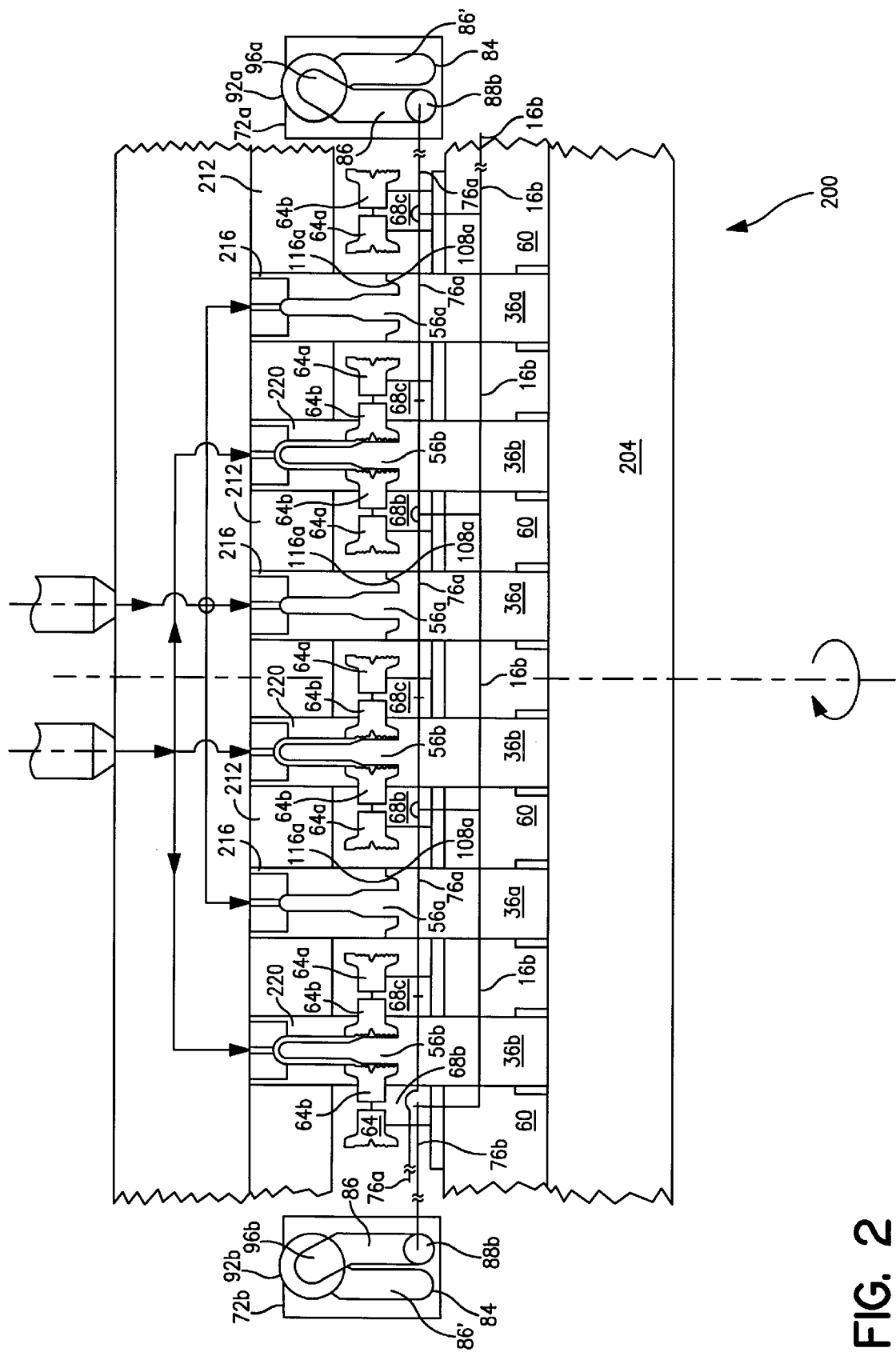
FIG. 2 shows a schematic representation of a section through a portion of the core plate, stripper plate, cavity plate and a pair of slide operators of an injection molding machine and a mold in accordance with another embodiment of the present invention.
Figure 2A:
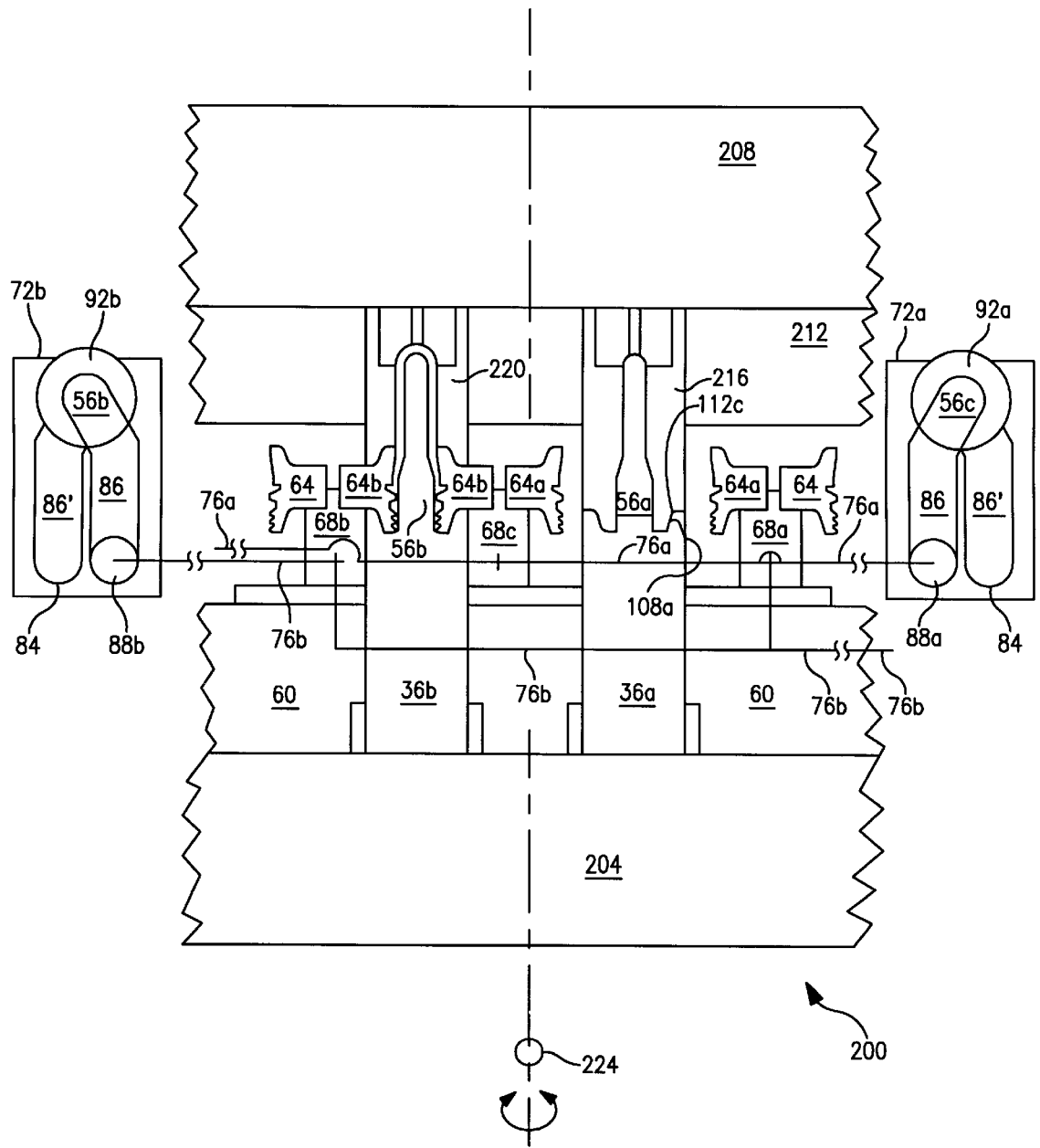
FIG. 2a shows the center portion of the machine of FIG. 2 with two cores and two cavities.

Machine 200 also includes a manifold plate 208 and a mold cavity plate 212 to which a plurality of pairs of cavities 216 and 220 are mounted. As shown, cavity 216 has a smaller diameter than cavity 220 and has a greater depth than cavity 220. As is indicated in FIG. 2a, only a portion of core plate 204, stripper plate 60 and cavity plate 208 are shown for clarity and, in use, machine 200 can include forty-eight or more core assemblies 36 on core plate 204 and a corresponding number of cavities, arranged as adjacent pairs of cavities 216 and 212 on cavity plate 208. Accordingly, core plate 204 and mold cavity plate 212 have like numbers of cores and cavities, respectively, which can be arranged in a square, rectangular or other shaped array, as desired.

Core plate 204 is rotatable about central axis 224 and cavities 216 and 220 are arranged in the array on mold cavity plate 208 such that rotation of core plate 204 through one hundred and eighty degrees will result in each core 56 which was axially aligned with one of cavities 216 and 220 before the rotation, being axially aligned with the other of cavities 216 and 220 after the rotation. In a presently preferred embodiment, rotation of core plate 204 is reciprocating, i.e.—turning one hundred and eighty degrees in a first direction and then turning one hundred and eighty degrees in the opposite direction. While reciprocal rotation simplifies the various connections which must be affected to core plate 204 and the components mounted thereon, reciprocal rotation is not required and continuous rotation in a single direction is also possible.

The operation of machine 200 sill now be described. For clarity, the molding of a single article on a single core 56a will be described, although it will be apparent to those of skill in the art that each core 56 is identical to each other core 56 and that an article is generally always being molded on each core 56, albeit at one of two different stages, except at start up or shut down of machine 200.

In FIG. 2a, a molding cycle is commenced with core 56a inserted into cavity 216. A shown, cam followers 88a and 88b are located in the straight portions of legs 86 of cam tracks 84 and slides 68a and 68c are thus moved away from each other, allowing cavity 216 to be inserted therebetween to engage the base of core 56a. As shown, the base of core 56a includes an inclined surface 108a which engages a complementary inclined surface 112a on cavity 216 to assist in sealing cavity 216. A first injection operation is then performed into cavity 216 to form a first layer of a molded article.

Figure 3:
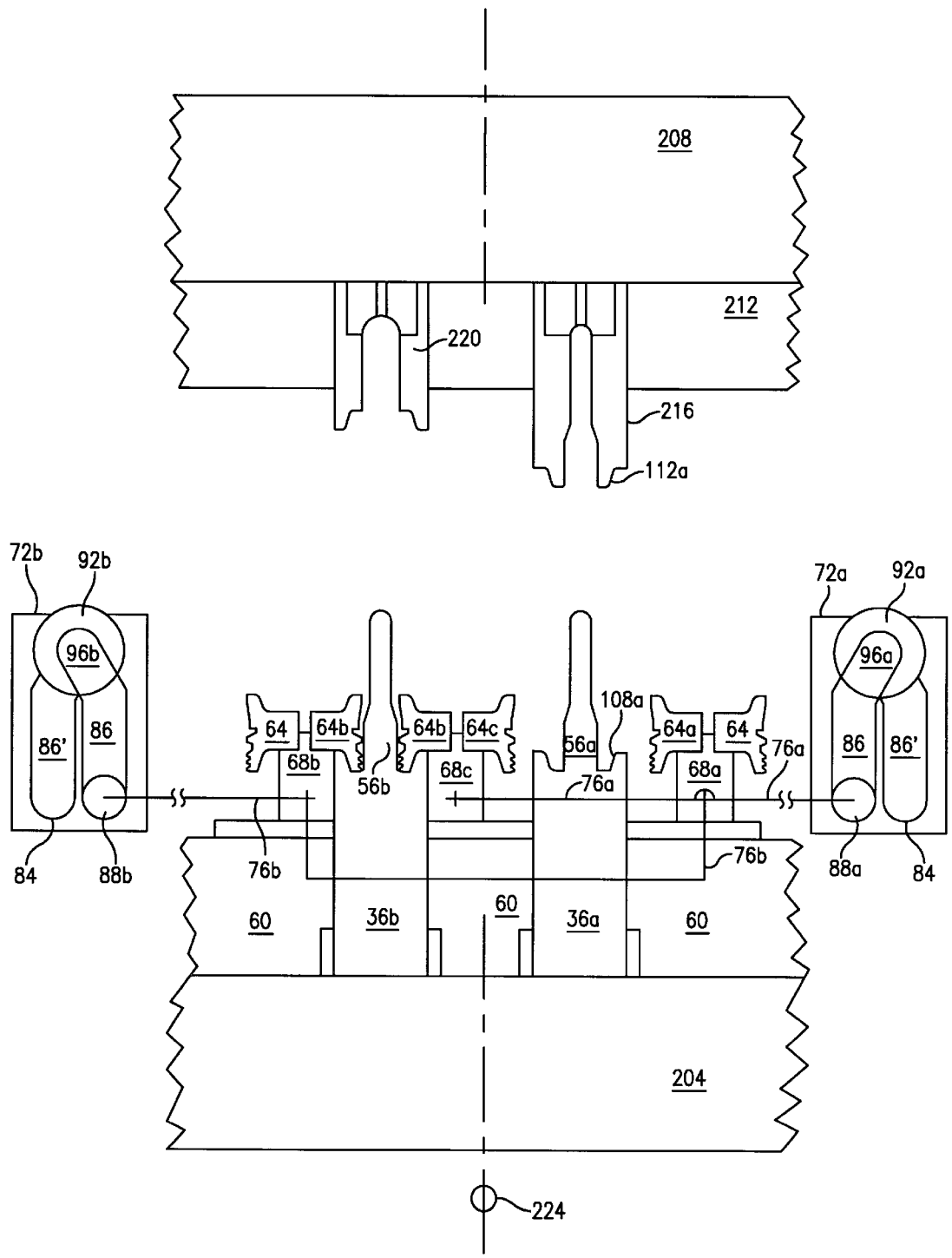
FIG. 3 shows the injection molding machine of FIG. 2a with the core and stripper plate separated from the cavity plate with the slide operators in a first position.
Figure 4:
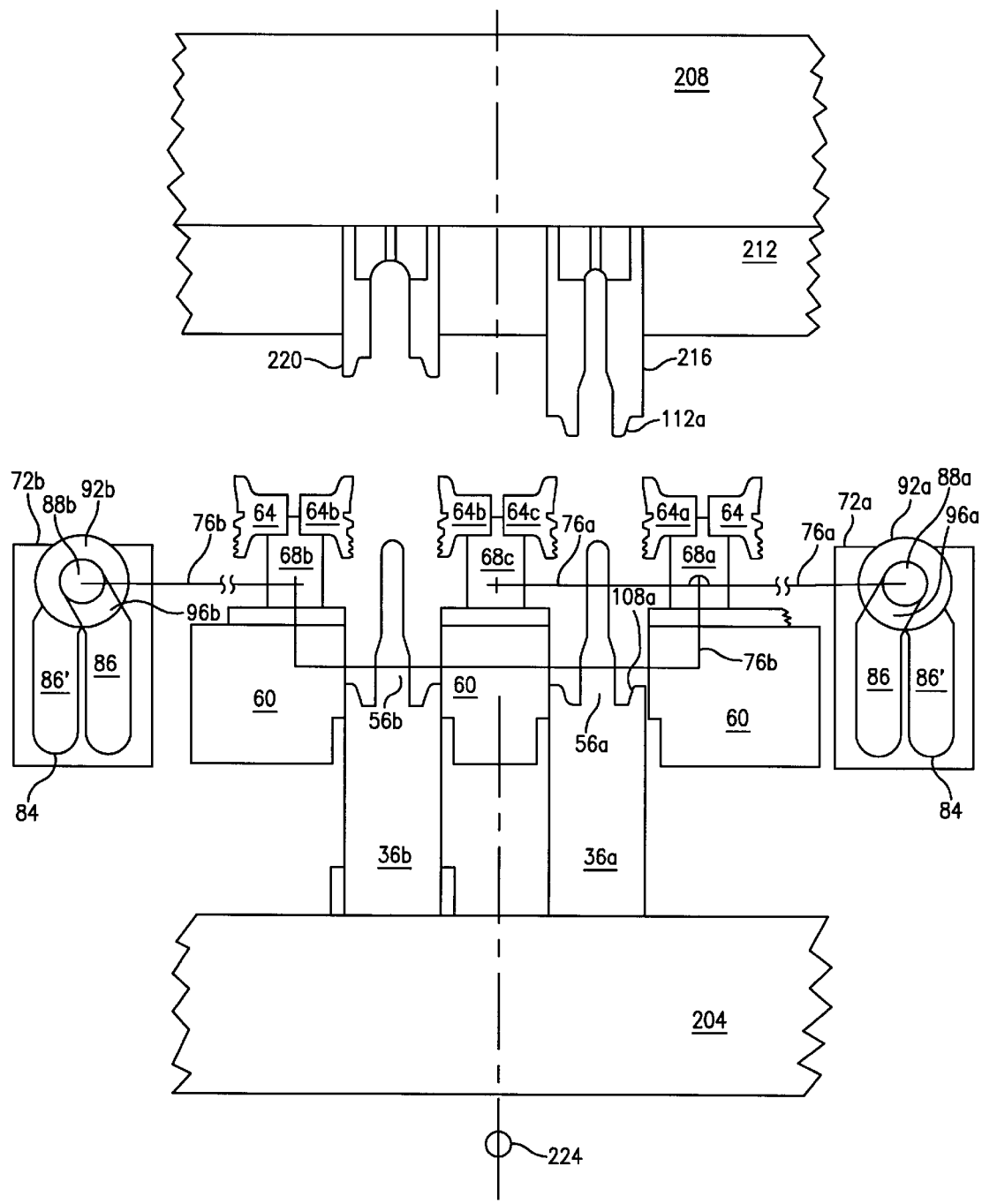
FIG. 4 shows the injection molding machine of FIG. 3 with the stripper plate separated from the core plate.

Next, core plate 204 is moved away from mold cavity plate 208, as shown in FIG. 3 and the first layer molded onto core 56a in cavity 216 remains on core 56a. Next, as shown in FIG. 4, stripper plate 60 is moved away from core plate 204 and, as can be seen, cam followers 88a and 88b move with stripper plate 60 and enter gates 96a and 96b respectively, moving slides 68 to the mid-points of their range of movement with respect to each other.

As will be apparent to those of skill in the art, the movement of stripper plate 60 will remove a finished article, if present, from core 56b until cam followers 88a and 88b enter the inclined portions of leg 86, moving the pair of cavity extension elements 64b away from each other, allowing the completed article to fall, or be otherwise removed, from machine 200.

Figure 5:
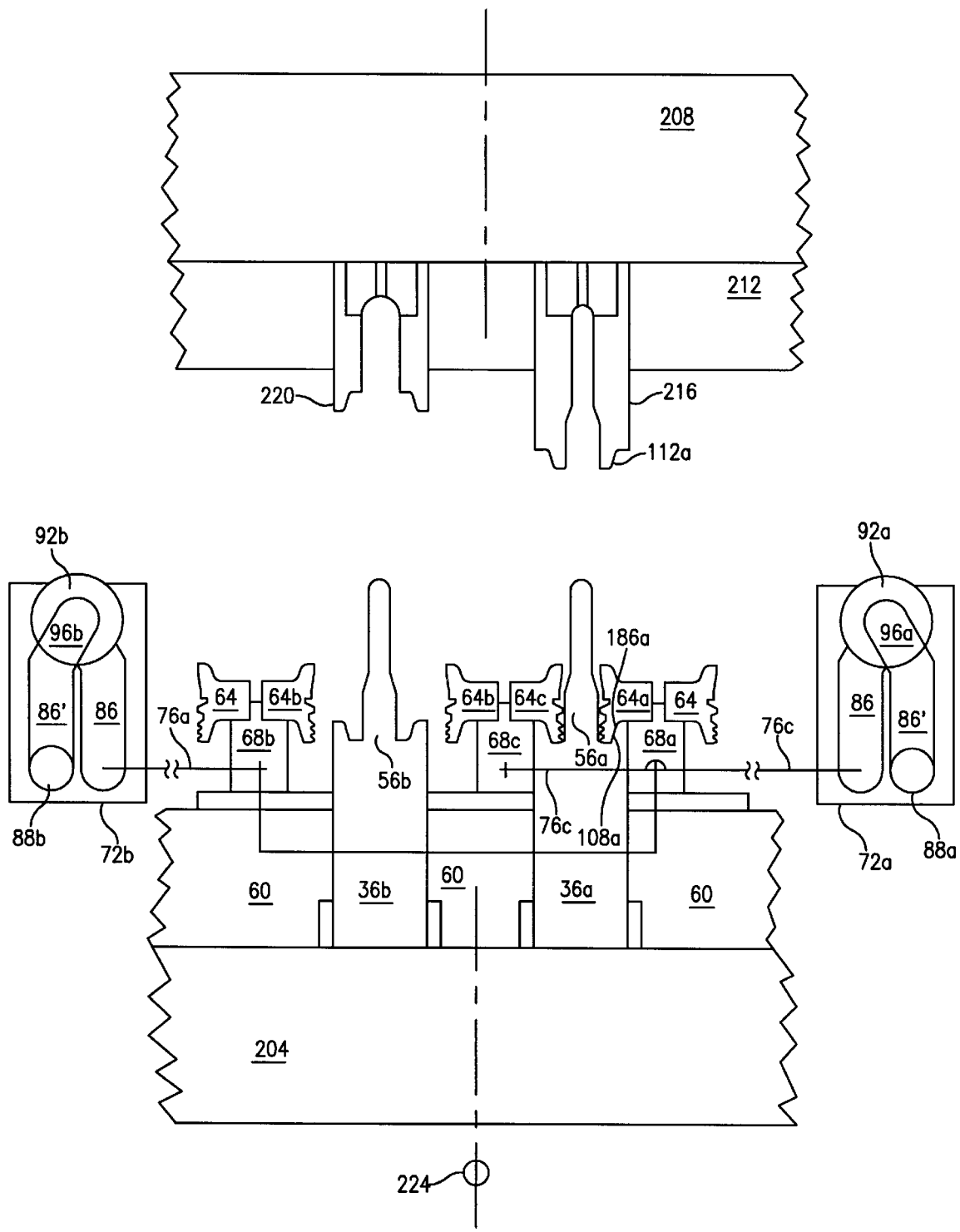
FIG. 5 shows the injection molding machine of FIG. 4 wherein the stripper plate has been moved back to the core plate with slide operators in a second position.

Next, as shown in FIG. 5, cam directors 92a and 92b are rotated to bring gates 96a and 96b into alignment with legs 86' and stripper plate 60 is moved toward core plate 204. As cam followers 88a and 88b ride on the inclined portion of legs 86', tierods 76a and 76b move slides 68b and 68c away from each other and slides 68c and 68a toward each other, thus closing the pair of cavity extension elements 64a about the article formed on core 56a in the first injection operation and opening the pair of cavity extension elements 64b about core 56b as shown. Closed cavity extension elements 64a define an inclined surface 116a which is complementary to and engages inclined surface 108a.

Figure 6:
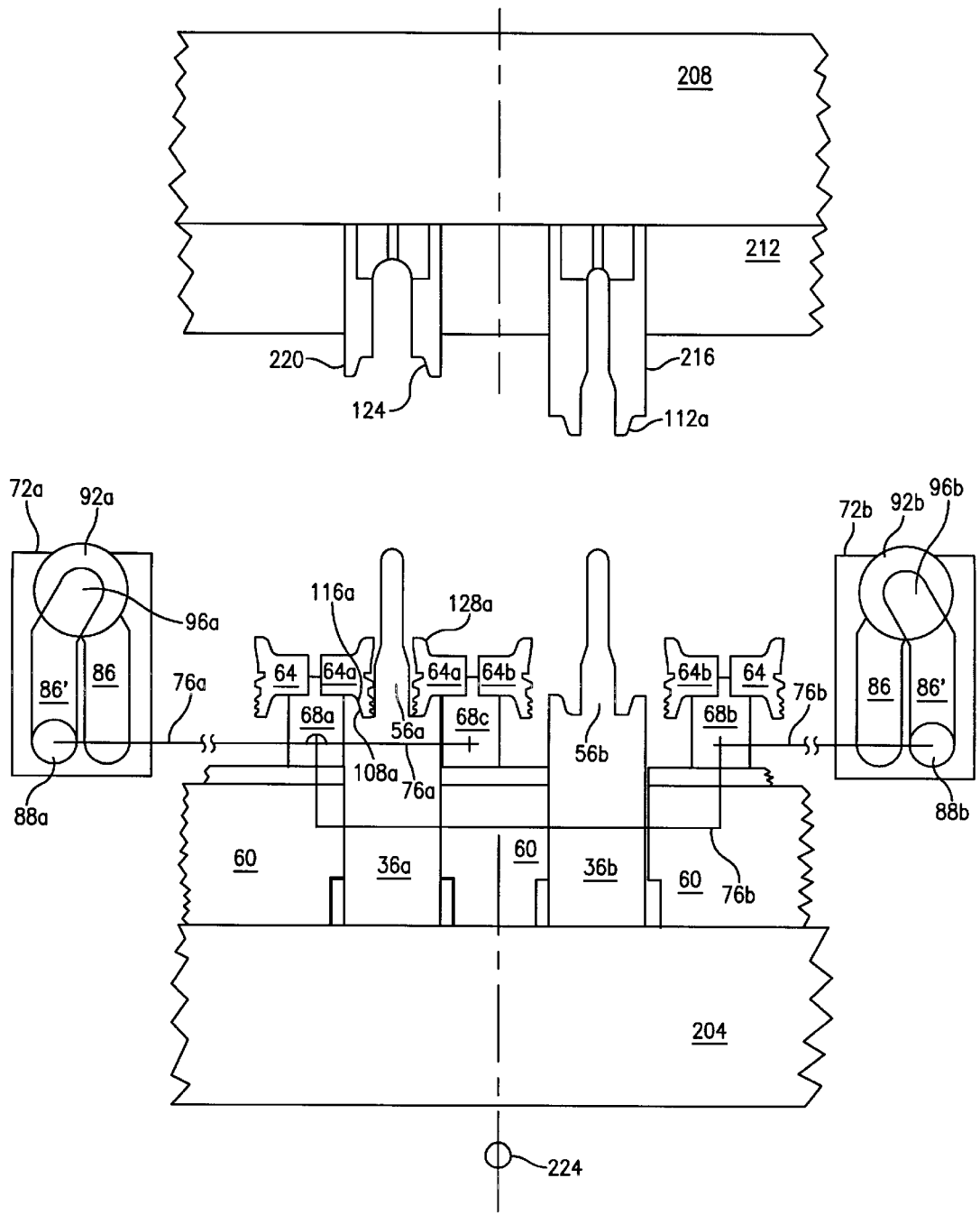
FIG. 6 shows the injection molding machine of FIG. 5 after the core plate has been rotated with respect to the cavity plate.

Next, as shown in FIG. 6, core plate 204 is rotated about center axis 224 to align core 56a with cavity 220 and core 56b with cavity 216. As will be apparent to those of skill in the art, cavities 216 and 220 can be arranged in a variety of manners on cavity plate 212. For example, all of cavities 220 can be on one side of central axis 224 and all of cavities 216 can be on the other. Alternatively, cavities 216 and 220 can be arranged in repeating sets of pairs on either side of center axis 224, with the ordering of the pairs being reversed on either side of center axis 22. Other arrangements of cavities 216 and 220, including mixtures and combinations of those mentioned above, will occur to those of skill in the art.

Figure 7:
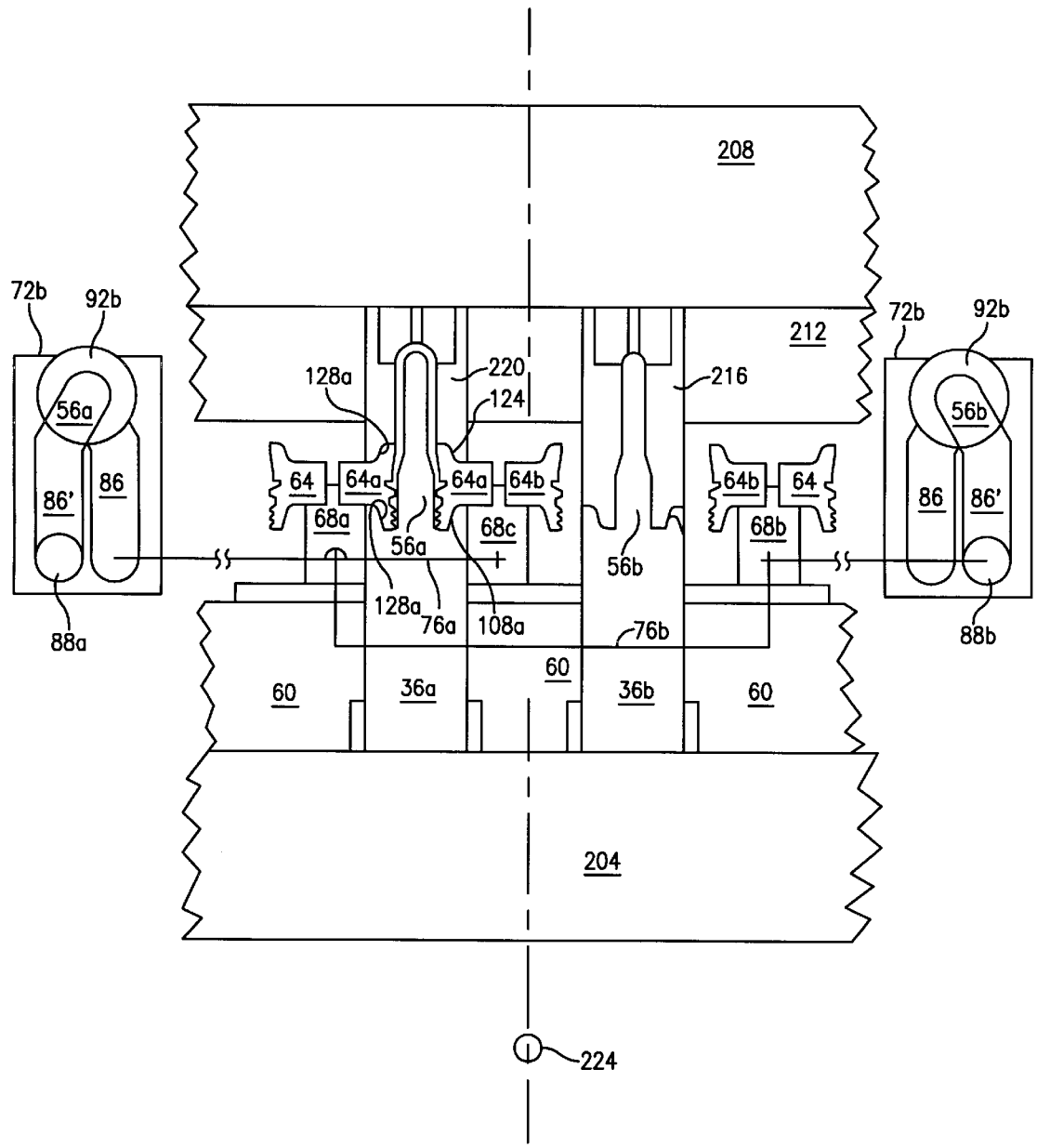
FIG. 7 shows the injection molding machine of FIG. 6 after the cavities have been closed.

Next, core plate 204 is moved toward cavity plate 208 to close the mold, as shown in FIG. 7, and a second injection operation is performed in cavity 220, over-molding the first layer previously formed on core 56a with a second layer. As shown in FIG. 7, closed cavity extension elements 64a define a second inclined surface 128a which is complementary to and engages inclined surface 124 of cavity 220.

When the second injection operation of FIG. 7 is complete, machine 20 is in the same state as that shown in FIG. 2a, albeit with the two cores in a reversed configuration, and the another molding cycle commences with the machine repeating the steps discussed above with respect to FIGS. 3 through 7.

As was the case for machine 20, either or both of the injection operations of machine 200 can be injections of single materials or can be co-injection operations, either simultaneous or sequential, as desired.

While each of machines 20 and 200 have been described as having cavity extension elements 64 on the cavity used for the second injection operation, it will be apparent to those of skill in the art that this can be reversed, if desired, to allow creation of features of different geometries on the first layer which are then covered by the second layer. For example, the jeweled diffraction areas of an automotive indicator light lens can be molded in a first cavity having cavity extension elements to define the jeweled area and then inserted into a larger, second cavity in which a second layer of material is over-molded on the lens to form a smooth outer layer. The first layer can be molded in red translucent material, for example, and the second layer in transparent material.

It is also contemplated that the present invention can be employed in circumstances wherein a single, common, cavity is employed with different cores. In such an embodiment, the molded article is formed by a first injection operation into the cavity with a large core in place. The large core is then removed and replaced with a smaller core, while the article remains in the cavity, and a second injection operation is then performed to complete the article. The article is then ejected from the cavity and the cycle is repeated. In over-molding processes wherein the article remains on the core for each molding operation, there can be difficulty in providing adequate cooling through the core after the injection molding operation. This is because the first layer formed on the core acts to some extent as an insulator, inhibiting heat transfer between subsequent layers and the core. In the common cavity-multiple core embodiment of the present invention, this difficulty can be avoided by changing the core between injection operations.

Figure 8:
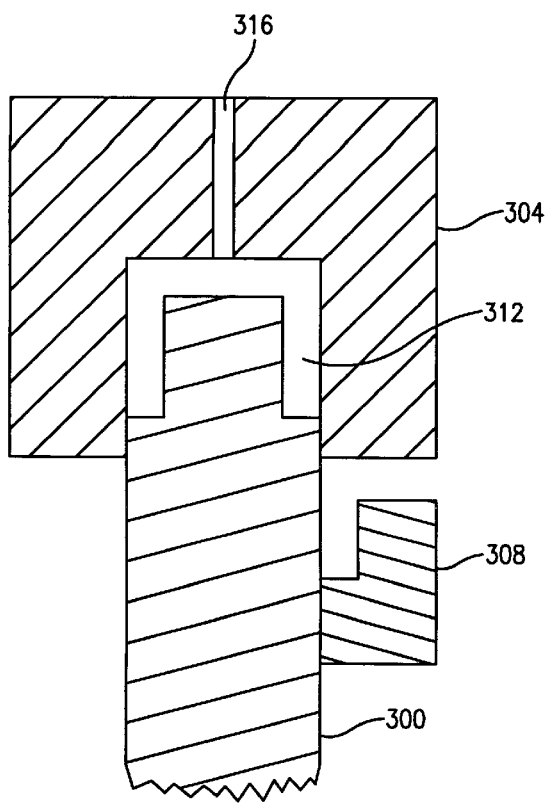
FIG. 8 shows a cross section through a core, cavity extension and first cavity in accordance with another embodiment of the present invention.

FIG. 8 shows another embodiment of the present invention comprising a core 300 and a first cavity 304 and a cavity extension 308. In FIG. 8, core 300 and first cavity 304 form a mold cavity 312 and cavity extension 308 is in a disengaged position, as shown. When an injection operation is performed, through inlet 316, a first layer of an article is formed in cavity 312. Core 300 is then removed from cavity 304, with the first layer of the article on it.

Figure 9:
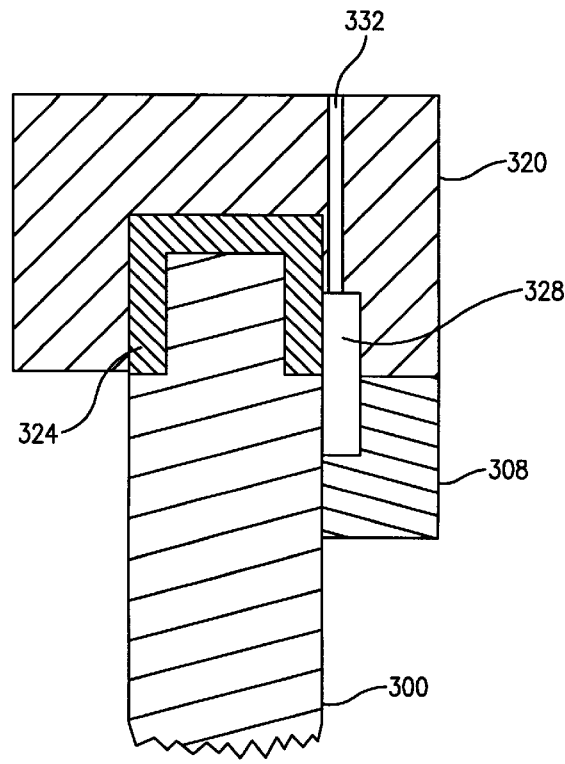
FIG. 9 shows a cross section through the core and cavity extension of FIG. 8 and a second cavity.

As shown in FIG. 9, core 300 is then inserted into a second cavity 320 with the first layer of the article 324 on core 300 and a composite cavity 328 is formed by moving cavity extension 308 into an engaged position with cavity 320. In this example, composite cavity 328 overlaps only a portion of article 324 and it will be apparent to hose of skill in the art that the present invention is not limited to the complete over-molding of a first layer of an article and can instead be employed to over-mold only portions of a first layer.

An injection operation is performed through inlet 332 to fill cavity 328 and core 300 and cavity extension 308 are separated from cavity 320 with the over-molded article on core 300. Cavity extension 308 can then be moved along core 300, toward over-molded article 324, to eject article from core 300. As will be apparent to those of skill in the art, cavity extension 308 engages only a portion of cavity 320 in this embodiment to form composite cavity 328 and cavity extension 308 is a single part.

Figure 10:
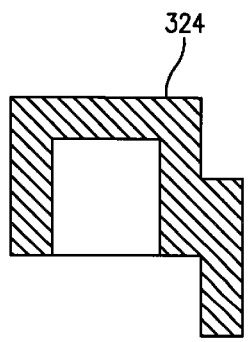
FIG. 10 shows a cross section through an article produced in the mold of FIGS. 8 and 9.
Figure 11:
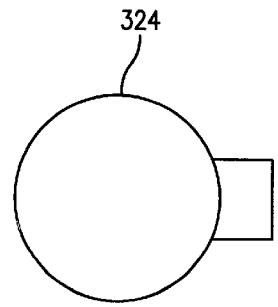
FIG. 11 shows a top view of the article of FIG. 10.

FIGS. 10 and 11 show an example of the irregular geometry of article 324 which can be obtained with the present invention. Further, while in this example both the first and second injection operations employed the same materials, resulting in article 324 having a homogenous structure, it will be apparent to those of skill in the art that the first and second injection operations can employ different materials and can in fact be co-injection operations, if desired.

While the description above only specifically refers to turret and rotary machines, it will be apparent to those of skill that the present invention is not so limited and can be employed wit shuttle-type or other machine types.

The above-described embodiments of the invention are intended to be examples of the present invention and alterations and modifications may be effected thereto, by those of skill in the art, without departing from the scope of the invention which is defined solely by the claims appended hereto.

We claim:

1. A method of injection molding an over-molded article, comprising the steps of:
   (i) moving a cavity extension associated with a core to a disengaged position, wherein for each said core there is a corresponding said cavity extension;
   (ii) inserting said core into a first cavity having a defined volume and a first geometrical configuration;
   (iii) performing a first molten plastic injection operation into said first cavity to form a first layer of said article while said cavity extension is in the disengaged position;
   (iv) removing said core from said first cavity with said first layer of said article on said core;
   (v) moving said cavity extension to an engagement position;
   (vi) inserting said core and said first layer into a second cavity, said second cavity and said cavity extension engaging to form a composite cavity having a larger volume than said defined volume and defining a second geometrical configuration;
   (vii) performing a second molten plastic injection operation into said composite cavity to over-mold said first layer to form an article;
   (viii) separating said core and cavity extension from said the second cavity to remove said article therefrom; and
   (ix) moving said cavity extension relative to said core to remove said article from said core.

2. The method of claim 1 wherein said cavity extension comprises two cavity extension elements laterally movable toward and away from said core and said disengaged position is achieved when said two cavity elements are moved away from said core and said engaged position is achieved when said elements are moved toward said core to engage each other.

3. The method of claim 1 wherein said first and second injection operations inject the same material into said first and second cavities.

4. The method of claim 1 wherein said first injection operation injects a first material into said first cavity and said second injection operation injects a second material into said composite cavity.

5. The method according to claim 1 wherein at least one of said first and second injection operations is a co-injection operation.

6. The method according to claim 1 wherein, prior to step (iii) an insert is placed in said first cavity.

7. The method according to claim 1 wherein, prior to step (vii) an insert is placed in said composite cavity.

8. A method of molding an over-molded plastic article, comprising the steps of:
   opening a cavity extension associated with a core to an open position, wherein for each core there is a corresponding cavity extension;
   inserting the core into a first cavity while the cavity extension is open;
   injecting a molten plastic between the core and the first cavity while the cavity extension is open;
   extracting the core from the first cavity with the injected plastic on the outside of the core;
   inserting the core into a second cavity that has a different configuration than the first cavity;
   closing the cavity extension to a closed position;
   injecting a further molten plastic between the second cavity and the injected plastic on the outside of the core; and
   removing the over-molded plastic article from the second cavity.

9. A method according to claim 8, wherein the step of opening the cavity extension comprises the step of moving apart two portions of the cavity extension.

10. A method according to claim 8, further comprising the step of moving the core between the injecting steps.

11. A method according to claim 10, wherein the cavity extension is moved together with the core.

12. A method according to claim 8, wherein the molten plastic and the further molten plastic comprise different materials.

13. A method according to claim 8, wherein the molten plastic and the further molten plastic comprise the same material.

14. A method according to claim 8, wherein the cavity extension provides a molding cavity extension to said second cavity.

15. A method according to claim 8, wherein the recited steps are performed in the recited order.

16. A method according to claim 8, wherein the recited steps are not performed in the recited order.

17. A step of molding a plastic article having at least two layers, comprising the steps of:

opening at least two portions of a cavity extension;

moving a core-carrier to a first molding station, said core-carrier having a core and the cavity extension on one face thereof;

moving a first cavity relative to the core to form a first injection cavity;

injecting a molten plastic into the first injection cavity while the two portions of the cavity extension remain open;

removing the core from the first cavity while the injected plastic remains on an outer surface of the core;

moving the one face of the core-carrier to a second molding station having a second cavity;

moving the second cavity relative to the core;

closing the at least two portions of the cavity extension to form a second injection cavity with said second cavity;

injecting a further molten plastic into the second injection cavity while the two portions of the cavity extension remain closed;

moving the one face of the core-carrier to an extraction station; and opening the at least two portions of the cavity extension and extracting the plastic article from the core.

18. A method according to claim 17, wherein the recited steps are performed in the recited order.

19. A method according to claim 17, wherein the recited steps are not performed in the recited order.

* * * * *